United States Patent [19]

Bailey et al.

[11] 4,210,931
[45] Jul. 1, 1980

[54] VIDEO PLAYER AND/OR RECORDER WITH HADAMARD TRANSFORM

[75] Inventors: Jack H. Bailey, Millbrook; Gerald H. Ottaway, Pleasant Valley, both of N.Y.

[73] Assignee: DiscoVision Associates, Los Angeles, Calif.

[21] Appl. No.: 973,839

[22] Filed: Dec. 28, 1978

[51] Int. Cl.² ............................................. H04N 5/79
[52] U.S. Cl. .................................. 358/128.5; 360/32; 360/9
[58] Field of Search ....................... 358/4, 8, 128, 160; 360/8, 9, 33, 40, 22, 32

[56] References Cited

U.S. PATENT DOCUMENTS

| | | | |
|---|---|---|---|
| 3,976,826 | 8/1976 | Fulton, Jr. | 358/160 X |
| 4,001,564 | 1/1977 | Bied-Charreton et al. | 360/40 X |
| 4,048,658 | 9/1977 | Nakagawa | 360/9 |
| 4,134,134 | 1/1979 | Lux | 360/8 X |

Primary Examiner—Bernard Konick
Assistant Examiner—Donald McElheny, Jr.
Attorney, Agent, or Firm—W. S. Robertson

[57] ABSTRACT

An apparatus for performing a Hadamard transform on video data for compression of data to be recorded and decompression of data read from a record for display achieves the necessary high rate by means of two or more adders and two subtractors operating in parallel. A store that holds the data during successive passes through an arithmetic unit has accessing circuits and a set of registers and associated gates that fetch and store the data in a repetitive sequence that simplifies storage accessing. Data is processed in units that represent for example eight lines of a television picture and an output buffer is provided for the decompressor of a video disk player that receives data as it is processed and holds previously processed data unit by a storage accessing circuit that minimizes the amount of buffer storage that must be provided in the player.

5 Claims, 7 Drawing Figures

FIG. 2 — INITIAL

| ROW 0 | 00 | 01 | 02 | 03 | 04 | 05 | 06 | 07 |
|---|---|---|---|---|---|---|---|---|
| ROW 1 | 10 | 11 | 12 | | | | 16 | 17 |
| | 20 | 21 | 22 | | | | 26 | 27 |
| | 30 | 31 | | | | | | 37 |
| | 40 | | | | | | | 47 |
| | 50 | | | | | | | 57 |
| | 60 | | | | | | | 67 |
| ROW 7 | 70 | 71 | 72 | 73 | 74 | 75 | 76 | 77 |

FIG. 3 — FIRST PASS

| ROW 0 | 00-10 | 02-03 | 04-05 | 06-07 | 10-11 | 12-13 | 14-15 | 16-17 | ++ |
|---|---|---|---|---|---|---|---|---|---|
| ROW 1 | 20-21 | 22-23 | 24-25 | 26-27 | 30-31 | 32-33 | 34-35 | 36-37 | ++ |
| | 40-41 | 42-43 | 44-45 | 46-47 | 50-51 | 52-53 | 54-55 | 56-57 | ++ |
| | 60-61 | 62-63 | 64-65 | 66-67 | 70-71 | 72-73 | 74-75 | 76-77 | ++ |
| | 00-01 | 02-03 | 04-05 | 06-07 | 10-11 | 12-13 | 14-15 | 16-17 | +− |
| | 20-21 | 22-23 | 24-25 | 26-27 | 30-31 | 32-33 | 34-35 | 36-37 | +− |
| | 40-41 | 42-43 | 44-45 | 46-47 | 50-51 | 52-53 | 54-55 | 56-57 | +− |
| ROW 7 | 60-61 | 62-63 | 64-65 | 66-67 | 70-71 | 72-73 | 74-75 | 76-77 | +− |

FIG. 4 — SECOND PASS

| ROW 0 | 00-03 | 04-07 | 10-13 | 14-17 | 20-23 | 24-27 | 30-33 | 34-37 | ++++ |
|---|---|---|---|---|---|---|---|---|---|
| ROW 1 | 40-43 | 44-47 | 50-57 | 54-57 | 60-63 | 64-67 | 70-73 | 74-77 | ++++ |
| | 00-03 | 04-07 | 10-13 | 14-17 | 20-23 | 24-27 | 30-33 | 34-37 | +−+− |
| | 40-43 | 44-47 | 50-57 | 54-57 | 60-63 | 64-67 | 70-73 | 74-77 | +−+− |
| | 00-03 | 04-07 | 10-13 | 14-17 | 20-23 | 24-27 | 30-33 | 34-37 | ++−− |
| | 40-43 | 44-47 | 50-57 | 54-57 | 60-63 | 64-67 | 70-73 | 74-77 | ++−− |
| | 00-03 | 04-07 | 10-13 | 14-17 | 20-23 | 24-27 | 30-33 | 34-37 | +−−+ |
| ROW 7 | 40-43 | 44-47 | 50-57 | 54-57 | 60-63 | 64-67 | 70-73 | 74-77 | +−−+ |

FIG. 5 — THIRD PASS

| ROW 0 | 00-07 | 10-17 | 20-27 | 30-37 | 40-47 | 50-57 | 60-67 | 70-77 | ++++++++ |
|---|---|---|---|---|---|---|---|---|---|
| ROW 1 | 00-07 | 10-17 | 20-27 | 30-37 | 40-47 | 50-57 | 60-67 | 70-77 | +−+−+−+− |
| | 00-07 | 10-17 | 20-27 | 30-37 | 40-47 | 50-57 | 60-67 | 70-77 | ++−−++−− |
| | 00-07 | 10-17 | 20-27 | 30-37 | 40-47 | 50-57 | 60-67 | 70-77 | +−−++−−+ |
| | 00-07 | 10-17 | 20-27 | 30-37 | 40-47 | 50-57 | 60-67 | 70-77 | ++++−−−− |
| | 00-07 | 10-17 | 20-27 | 30-37 | 40-47 | 50-57 | 60-67 | 70-77 | +−+−−+−+ |
| | 00-07 | 10-17 | 20-27 | 30-37 | 40-47 | 50-57 | 60-67 | 70-77 | ++−−−−++ |
| ROW 7 | 00-07 | 10-17 | 20-27 | 30-37 | 40-47 | 50-57 | 60-67 | 70-77 | +−−+−++− |

VIDEO PLAYER AND/OR RECORDER WITH HADAMARD TRANSFORM

RELATED APPLICATIONS

Our application Ser. No. 814,017 entitled "Video Recording Disk with Interlacing of Data for Frames on the Same Track," filed July 8, 1977, now U.S. Pat. No. 4,161,753 describes a video record and an associated player system and has helpful background information and is incorporated by reference in this specification. Our application Ser. No. 974,183 entitled "Video Player/Recorder With Non-Linear Mark Length Modulation," filed Aug. 28, 1978, discloses a video player and/or recorder. These applications have helpful background information and are incorporated by reference in this specification.

INTRODUCTION

It will be helpful to review some of the features of conventional systems that use matrix multiplication apparatus for compressing digitally encoded television pictures. A television picture in the NTSC system has successive frames that are each made up of two interlaced fields. A field has $262\frac{1}{2}$ horizontal lines. In the system that will be described in detail later, the horizontal lines are handled in groups of eight and each of these groups is further divided into points along the horizontal lines that form for example, sixty-four eight by eight matrices of picture elements or points. A matrix in which the elements are digitized luminance values is called the X matrix.

The general technique for compressing data that will be used in this specification can be described by the following equation.

$$[G] = [A][X][B] \quad (1)$$

A and B are matrices that are multiplied by the X matrix, and the resulting matrix is designated G. The reverse operation of converting a G matrix to the original X matrix can be understood from the following two equations.

$$[X] = [A^{-1}][G][B^{-1}] \quad (2)$$

or, $$[X] = [A^{-1}]([A][X][B])[B^{-1}]) \quad (3)$$

The parenthesis in equation (2) enclose the original terms in equation (1) which are substituted for G in equation (2). $A^{-1}$ is the inverse of martix A and $B^{-1}$ is the inverse of matrix B. When a matrix is multiplied by its inverse, the result is the identity matrix, designated I. The identity matrix is a square matrix having 1's along the principal diagonal (upper left to lower right) and having 0's in other locations. The product of a matrix and the identity matrix is the matrix itself. From these properties equation (3) simplifies as is shown in the following two steps.

$$[X] = [I][X][I] \quad (4)$$

or $$[X](\text{reconstructed}) = [X](\text{original})$$

The G matrix in its initial form requires more bits per element than the original X matrix, and data compression does not take place merely by the transform operation that has been described. Compression takes place when selected terms of the G matrix are given zero values that are not stored or when selected terms are truncated or are given representative values that are coded by only a few bits. The compressed G matrix is designated G*.

The Hadamard matrix is a square matrix of +1 and −1 elements as in the following example.

$$H = \begin{matrix} +1 & +1 \\ +1 & -1 \end{matrix} \quad (5)$$

Thus, multiplication by a Hadamard matrix is performed as a series of adds and subtracts. Two properties of the Hadamard matrix are that the matrix is its own inverse and its own transpose.

$$H = H^{-1} \quad (6)$$

$$H = H^T \quad (7)$$

Thus, the general terms A and B and their inverses in the generalization of equation (2) are replaced by operations called premultiplication and post multiplication by a single martix.

$$[G] = [H][X][H] \quad (8)$$

A specific example can now be understood from the steps of the following equations.

$$X = \begin{matrix} A & B \\ C & D \end{matrix} \quad (9)$$

$$G = \begin{matrix} +1 & +1 \\ +1 & -1 \end{matrix} \quad \begin{matrix} A & B \\ C & D \end{matrix} \quad \begin{matrix} +1 & +1 \\ +1 & -1 \end{matrix} \quad (10)$$

$$G = \begin{matrix} (A + C) & (B + D) & +1 & +1 \\ (A - C) & (B - D) & +1 & -1 \end{matrix} \quad (11)$$

$$G = \begin{matrix} (A + B + C + D) & (A + C - B - D) \\ (A - C + B - D) & (A + C - B + D) \end{matrix} \quad (12)$$

The elements A, B, C and D in equation (9) are multi-bit binary codes that represent the luminance values at four points on the television picture. Equation (10) shows all of the terms that take part in the matrix multiplication and equation (11) shows the intermediate results of multiplying [H] [X]. The explanation so far can be summarized by an intuitive description of equation (12). The term in the upper left hand corner is the sum of all the luminance values and thus gives an overall or average value for the X matrix. The term in the upper right hand corner is the sum of the left half of the X martix minus the sum of the right half. Similarly, the lower left term is the sum of the top half of the matrix minus the sum of the bottom half, and the lower right hand term is the difference between the two diagonals. Larger matrices (eight by eight for example) have more terms that similarly divide the X matrix in halves, quarters, and so on in different patterns. Because pictures are usually orderly, some of the elements of the G matrix tend to have larger values and some of the elements tend to have small values.

In the G* matrix, the small terms are dropped or are represented by only a few bits. Also, it can be seen intuitively that the premultiplication [H] [X] of equation (10) processes the information along the columns of the X matrix and that post multiplication processes the information along the rows.

The rows of a Hadamard matrix are called Walsh functions, and when the rows of the matrix are arranged in order of sequency, the matrix is called a Walsh-Hadamard matrix. (Sequency is the number of transitions between $+1$ and $-1$ along a row and it corresponds approximately to frequency in a Fourier series; for example the row $+1 +1 -1 -1$ has a sequency of 1.) The Walsh-Hadamard matrix is useful in a conceptual explanation because the terms of the G martix have the orderly distribution, but data compression apparatus can operate with any order to the rows, and the term Hadamard transform will generally be used in this specification with either meaning.

As has already been explained, a Hadamard transform is implemented by repetitive adds and substracts on pairs of terms in repetitive passes through an arithmetic apparatus. As example based on equations (6) through (9) will illustrate the arithmetic operations.

| original terms | first pass | second pass |
|---|---|---|
| A | A + B | A + B + C + D |
| B | A − B | A + B − (C + D) |
| C | C + D | A − B + C + D |
| D | C − D | A − B − (C − D) |

OBJECTS OF THE INVENTION

In the specific apparatus of this invention the picture information is handled in eight by eight matrices. The matrix multiplication requires six passes through the arithmetic unit for each X martix. One object of this invention is to provide a new and improved processing apparatus in which two or more adders and two or more subtractors are operated in parallel to perform the transform at high speed. A more specific object is to provide a new storage arrangement that speeds up the accessing of the store for fetching the pairs of terms that are to be added and subtracted and for storing the sums and differences. A related object of the invention is to reduce the size of the buffer memory that is required to hold the eight lines of the television signal that must be processed and stored before the first of these lines can be displayed.

SUMMARY OF THE INVENTION

The specific apparatus that will be described later has two adders and two subtractors and it operates on two pairs of terms simultaneously. A data store is organized to fetch the terms in a repeating sequence for each of the six passes and to store the sums and differences in a repeating sequence. The terms are stored in a sequence that takes advantage of the usual capability of a data store to fetch multi-unit data groups (here, four terms). To achieve this storing sequence, the apparatus includes a system of register and interconnecting gates that assemble sums and differences from preceeding arithmetic operations to provide a suitable storage format. This apparatus is useful for compressing data in a recording operation or in decompressing data in a video player.

In the player, a buffer memory holds eight lines of digitized video and a buffer memory of this size is a significant cost in the player. Data for the buffer is generated continuously and data is fetched from the buffer continuously for display. Conventionally, overlapping input/output operations of this kind are handled by duplicating the buffer and alternately loading one buffer and unloading the other. The apparatus of this invention has a single eight line output buffer and includes means that permits loading the buffer as storage locations become vacant by unloading.

THE DRAWING

FIGS. 2-5 are tables in processor storage showing data on successive passes through the arithmetic unit of the processor.

THE APPARATUS OF THE DRAWING

1. Introduction

Figure 1:
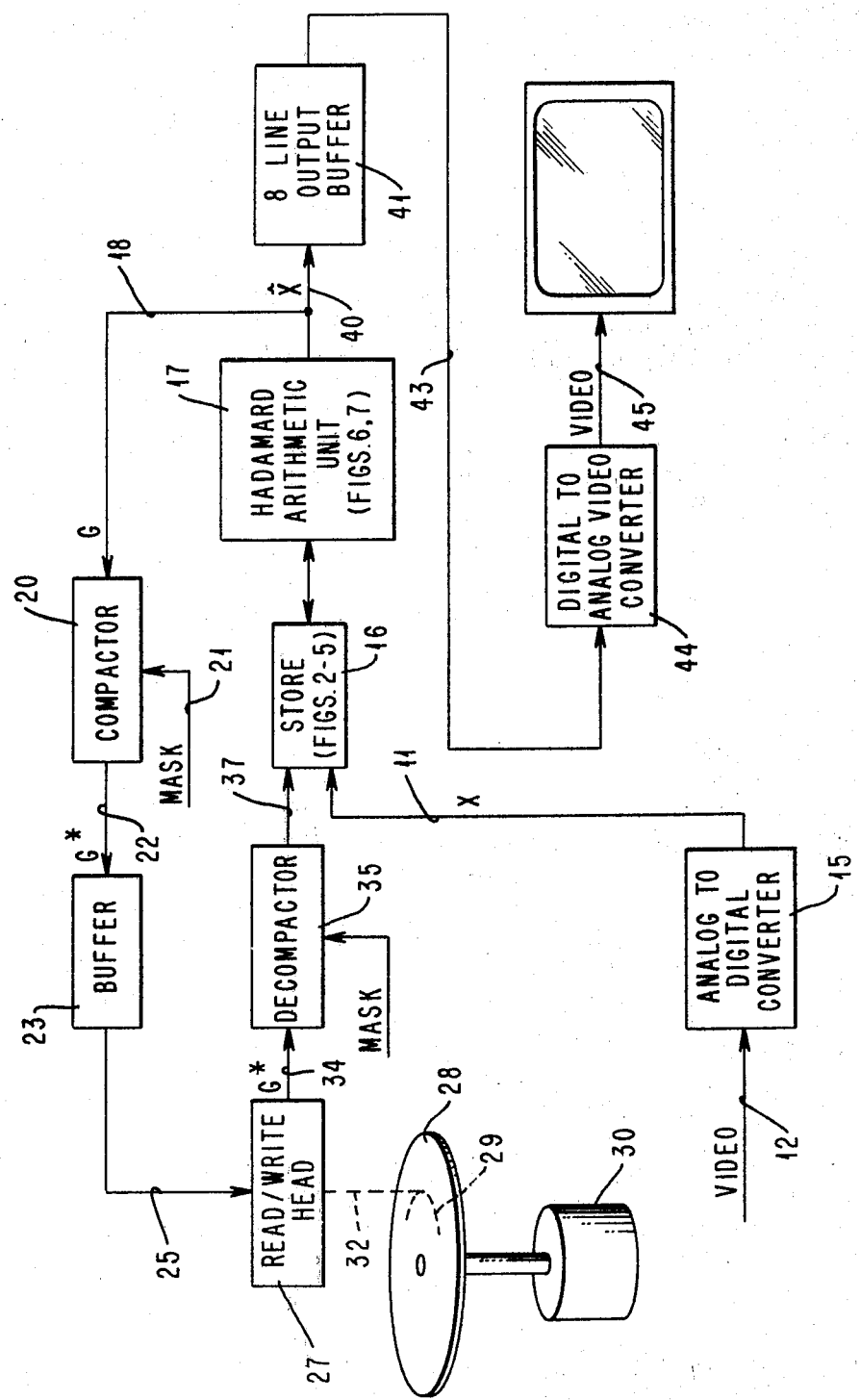
FIG. 1 is a schematic of a video player/recorder using the data compressor and decompressor apparatus of the invention.

Section 2 of this description introduces the disk read and write apparatus and the related Hadamard transform apparatus of FIG. 1. Section 3 continues the explanation of the Hadamard transform with a description of the arrays of FIGS. 3-6. Section 4 describes the Hadamard processing apparatus of FIGS. 7 and 8. Section 6 describes the output buffer addressing structure and the related operations.

2. The System of FIG. 1

Many of the components of the data compression system are identical to the corresponding components of a data decompression system for a player, and many other components of the compression and decompression systems are similar. To better show this relationship, FIG. 1 represents the general components of a video player/recorder that has both a compression and a decompression capability. However, it will simplify the explanation to first consider only the components of FIG. 1 that cooperate as a recorder and to then consider the components that cooperate as a player.

The television programming material that is to be recorded with data compression is provided in a digitized form on a line 11. Ordinarily the material will originate as an analog video signal from a source represented by line 12 which may be a television camera, a television signal from a television receiver, or a video tape of a program that is to be recorded. A digital to analog converter 15 receives the analog video signal on line 12 and produces the digitized signal on line 11. The signal on line 11 is a predetermined sequence of multi bit (for example, six bit) codes representing the luminance values which are to be compressed. The audio signals and I and Q signals are also supplied on line 12 to be digitized but they require only a relatively narrow bandwidth and are handled by known techniques. Alternatively, the I and Q signals may be compressed by the apparatus of this invention but only the wider band luminance signal will be referred to in this description. Similarly, the digital signals for identifying headers and for various control functions that are independent of the invention are supplied by source 12 but are not compressed.

The succession of multibit bode blocks on line 11 represent the sixty-four elements of the X matrix and they are loaded into a store 16 in a predetermined order as will be explained later in relation to FIG. 2. An arithmetic unit performs a matrix multiplication on the X matrix and produces an output on a line 18 that forms the G matrix in a predetermined order. Preferably the sixty-four G matrix terms are represented by twelve bits each (including a sign bit). A compactor 20 receives the G matrix terms on line 18 and receives a mask on a line 21. The output of the compactor on a line 22 is the G* matrix. The mask is a vector having a bit for each bit of the G matrix. Where the mask bit is a 0, the corresponding bit of the G matrix is dropped and where the mask bit is a 1 the bit is retained. A buffer 23 receives the signals on line 22 which occur irregularly as terms are dropped from the G matrix, and it supplies a continuous data output on a line 25.

The G* matrix terms that appear on line 25 are applied to the read/write head 27 of a video recorder. The recorder writes on a disk 28 along a representative data track 29 as the disk is rotated under the read head by a motor 30. For example, the disk can have a relatively thick glass substrate that carries a thin layer of tellurium and the read/write head includes a laser that illuminates the data track as represented by dashed line 32 to burn data signifying holes in the tellurium layer.

In an operation to read disk 28, the read/write head 27 illuminates a selected track 29 along dashed line 32 and light is reflected from the track according to the data written on the disk. Preferably the data is recorded as a sequence of reflective marks and non-reflective spaces that are modulated in length to represent code blocks of four bits. The read/write head converts these signals to four bit codes on a line 34. The signals on line 34 represent the original G* matrix. A decompactor 35 receives the G* terms on line 34 and a mask on a line 35 and produces the G matrix on a line 37. The G matrix has bits from line 34 where the corresponding mask bit is a 1 and it has inserted 0 bits where the corresponding mask bit is a 0. The G matrix on line 37 is processed by the Hadamard arithmetic unit 17 and store 16 in the way that has been outlined for the data compression operation on the X matrix terms on line 11. The output of the arithmetic unit on a line 40 is a matrix X of sixty-four elements of six bits each. The decompression operation proceeds in units of eight horizontal lines of the television picture, and an eight line buffer 41 accumulates the information for the current eight lines as the information appears on line 40 and it supplies the digital information for the previously accumulated eight lines on an output line 43. Conventional circuits 44 convert the digital signal to a signal on a line 45 that can be displayed on a television set 46.

3. FIGS. 2-5

Each of these figures in an eight by eight array representing a section of store 16 in the Hadamard transform apparatus. These arrays will be referred to respectively as Initial, First Pass, Second Pass and Third Pass. The term "initial" refers to the fact that this array holds the initial X terms for compression or the initial G* terms for decompression. The term "first pass" for example refers to the fact that it shows the results of the first pass through the arithmetic unit. Thus, the first pass array is the input array during the first pass through the arithmetic unit and it becomes the output array during the second pass. In the first pass array each element is identified by the corresponding row and column numbers in the sequence 0 through 7. Considered from one standpoint, these numbers represent octal values of a six-bit binary address of each of the sixty-four independently addressable data units. For example, storage location 00 in the upper lefthand corner of the array would be accessed by the six-bit binary address 000 000, and the next unit along the row would be accessed by the next number in the binary counting sequence, 000 001. Similarly, the rightmost element of row 0 has the octal address 07 and the binary address 000 111, and the leftmost element of the second row has the next sequential octal address 10 and binary address 001 000. Considered from another standpoint, the first pass matrix represents an eight by eight array of points on the face of the display tube and the entries in storage are the Hadamard transform of these points.

Data from the initial array is fetched in pairs of units in a sequence that will be explained later, and the sum and the difference of the pair terms are formed in the arithmetic unit and loaded into the second pass array in a particular sequence.

The legend "+ +" to the right of row 0 in the first pass array of FIG. 3 signifies that each entry in this row is the sum of a pair of successive elements from the preceding array. Similarly, the legend "+ −" to the right of row 3 in FIG. 3 symbolizes that the second term in the sequence in each box in the row is subtracted from the first term. This sequence continues for transforming the initial array into the first pass array. It can be seen that the sums in rows 0 through 3 corresponds to multiplication by the rows or columns of the Hadamard transform that begin the sequence $+1+1\ldots$, and that the legend $+-$ for rows 4 through 7 corresponds to multiplication by the rows or columns of the Hadamard transform that begin with the sequence $+1-1$. Since each row and each column of the Hadamard transform begins with a $+1$, the matrix of FIG. 4 represents a first pass for multiplication of the X matrix by the Hadamard matrix. (As will be explained later, the identical operation will be repeated with the matrix of FIG. 5 representing the intermediate product $(HX)^T$.)

In the second pass array, of FIG. 4, each element is a combination of 4 elements from the initial matrix according to the legend alongside each row at the right of the array. For example, the legend 00–03 in position 00 of the array shows that this element holds a combination of the elements 00, 01, 02 and 03 from the preceding array and the legend $++++$ to the right of the row signifies that this combination is the sum of each of these terms. Similarly, at address location element 20 is the combination $+00-01+02-03$; the element 20 at storage location 40 has the combination $+00-01-02-03$ and element 60 has the terms $+00-01-02+03$.

The organization and notation for the third pass array of FIG. 5 can be understood from the description so far, and these memory arrays will be understood from the following detailed descriptions of the store 16 and the arithmetic unit 17 of FIG. 1. In addition, the sequences of terms as they appear in FIGS. 2-5 are conventional in the fast Hadamard transform.

Figure 6:
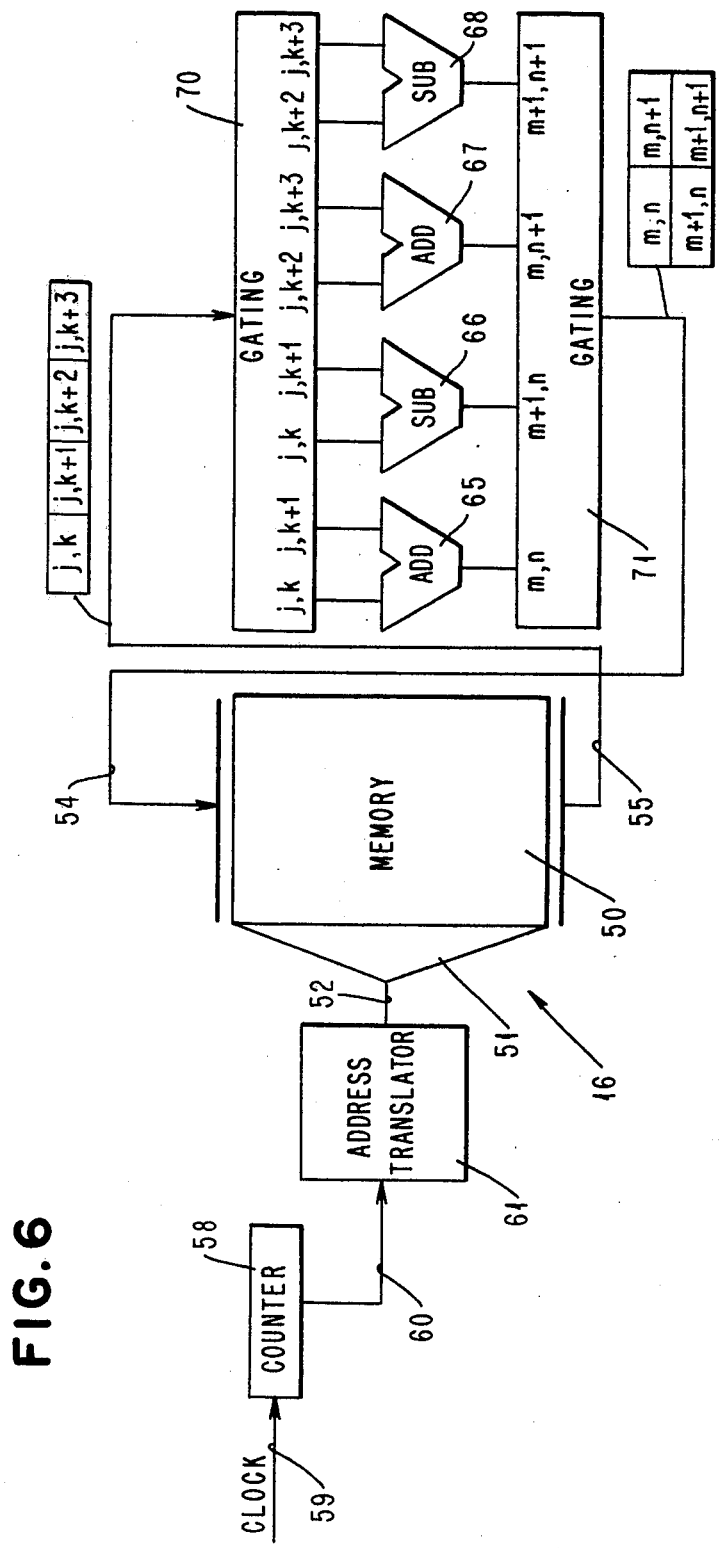
FIG. 6 is a schematic of the storage of FIG. 2-5 and an associated arithmetic unit.

FIG. 6—Memory Accessing Components

The memory 16 that is shown generally in FIG. 1 is conventional and has an array 50 of storage cells, an address decoder 51 that responds to an address on a line 52, a data input register and a data output register that are represented by bars at the top and the bottom of the array respectively, and associated input bus 54 and output bus 55. A four-bit counter 58 responds to clock pulses on a line 59 to produce at its output 52 a sequence that is appropriate for addressing memory 50 for the operations that will be described later. The memory is addressed differently for store and fetch operations and an address translator 61 provides an appropriate sequence of addresses on line 52 in response to the sequence of counter values on line 60. Address translator 61 may be a read only store having sixteen storage locations addressed by the four-bit address on line 60 with each storage location holding a store address and a fetch address that are applied sequentially to line 52 during two halves of a cycle of clock 59. Equivalent apparatus is well known. These components are conventional except for the address translating structure of translator 61 and this structure can be understood readily after a description of the other components. First, it will be helpful to consider some conventional aspects of memory addressing that are used in the apparatus of this invention.

Data stores are usually organized in the row and column structure of FIG. 2 with access for store and fetch operations made along the rows of the array. The unit of data enclosed in the boxes of the array of the drawing is the smallest unit of data that is addressable by the system associated with the data store, but to achieve a high data rate memories conventionally operate with a larger data unit that is called a memory word. In the system of this invention there are two memory words of four data units each in each row of the array of FIG. 2. Since there are sixty-four data units in the array of FIG. 2, it takes six address bits to address a data unit of the array. However, the four high order bits of the address identify a memory word of four data units and the two low order bits of the address identify one of the four data units within the memory word. (Higher order bits are used to distinguish one array from another in store 16.) As an example, the data unit having the octal address 26 has the corresponding binary address 010 110; it is fetched from memory by the four-bit address 0101 as part of a memory word that is made up of data units 24 through 27. The three high order bits of the memory address are a row address in FIG. 2 and the low order bit is a column address that identifies the right or left half of the array of FIG. 2. This conventional addressing arrangement has been explained because it is an object of the invention to store and fetch from the memory in data units that correspond to the width of the arithmetic unit and to fetch and store a full memory word on each cycle.

FIG. 6—The Arithmetic Unit

The arithmetic unit has two adders and two subtractors 65 through 68. The subtractors preferably operate as direct binary subtractors but alternatively they may be two's complement adders as is usual for general purpose arithmetic units. A gate 70 connects the memory data output bus 55 of the memory to the inputs of the adders and subtractors as is shown by the matrix notation in the drawing. A gate 71 connects the outputs of the adders and subtractors to the memory data in bus 54.

A fetch operation begins at a generalized location j,k where j=0 through 7 is the octal row address and k=0 through 7 is the octal column address. The fetch operation proceeds through location k+3. Notice that these four terms are located in a single memory word in the conventional memory addressing structure that has been described. Gate 70 includes AND or equivalent circuits (for a conventional timing function) that connect the inputs to the gate on bus 55 to the inputs of the adders and subtractors in the arrangement shown by legends in the drawing.

Similarly, the four outputs of the adders and the subtractors are applied to four storage locations in the input section of the memory 16 as the matrix notation in FIG. 6 shows. It can be seen that the sums are stored in one row and the differences are stored in a different row. (With this storage sequence, the terms are in the appropriate storage locations for the fetch operations of the next pass and the store and fetch operations are the same for each pass.) Thus, the simple addressing technique that has been described for the fetch operation is not directly possible for the store operation. The gating circuit 71 provides an output that permits storing a full memory word on each cycle in which a full memory word is fetched, as will be explained next in relation to FIG. 7.

Figure 7:
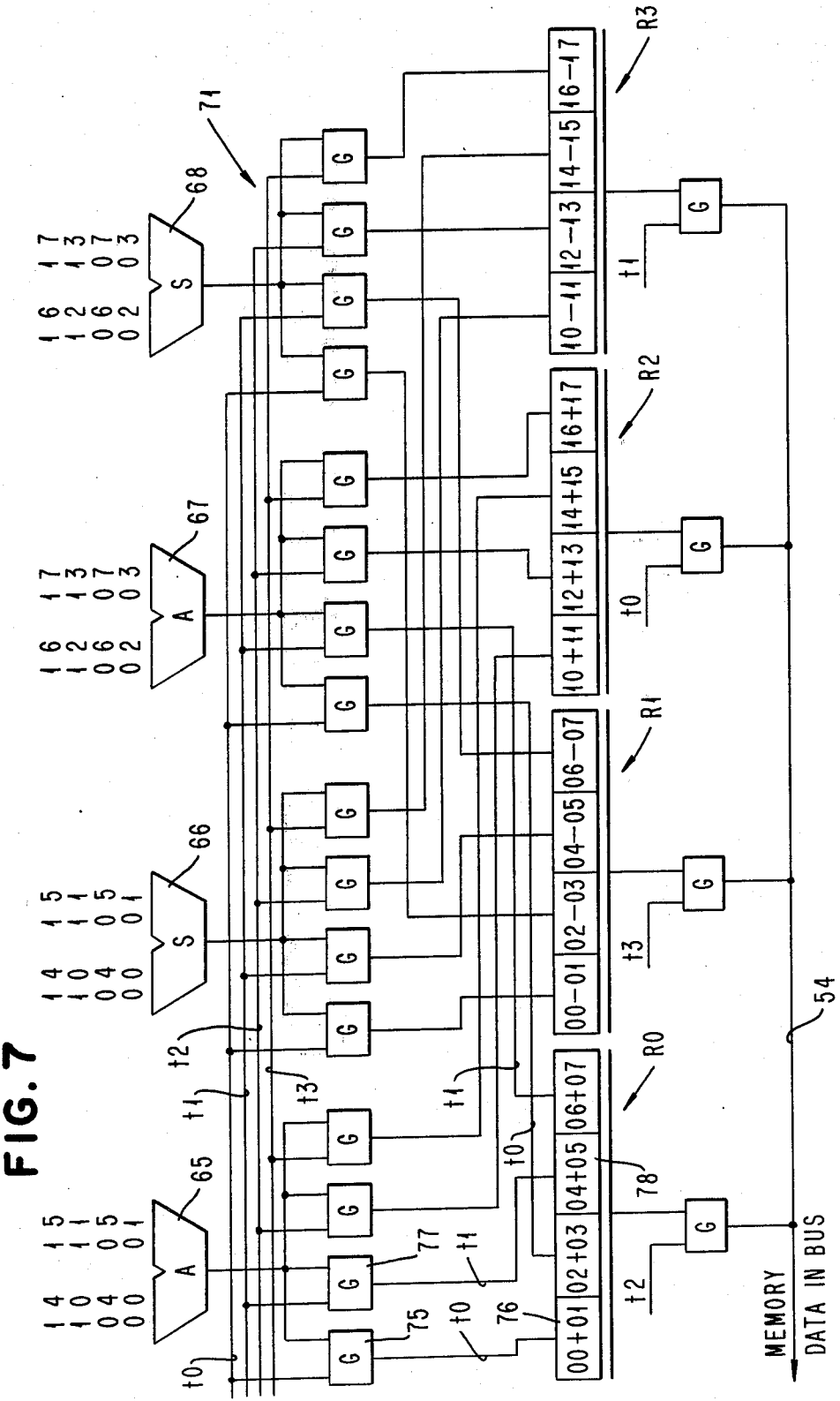
FIG. 7 is a schematic of a gating circuit connecting the arithmetic circuit and storage in FIG. 6.

Storage Accessing—FIG. 7

FIG. 7 shows the gating circuit 71 of FIG. 6 with legends that illustrate the operation of handling the outputs of the adders and subtractors in a way that facilitates a store operation in store 16. Above each of the two multi-bit inputs of the adders and the subtractors there is a column of octal addresses that represent four consecutive inputs on successive cycles for the adds and subtracts that are performed on the entries in the first two rows (0 and 1) of FIG. 2. The components that are connected to the outputs of the adders and the subtractors are arranged in the drawing in an order that can be easily understood.

The circuit has four registers, R-0 through R-3, that each store four units of data for the memory. Registers R-0 and R-1 operate alternately with registers R-2 and R-3 so that two registers are being loaded from the adders and the subtractors while the other two registers are being unloaded into the memory.

A set of gates connects each adder and each subtractor to a data location in a register. A set of timing lines is connected to the gates to transfer the contents of each adder and each subtractor to a particular register location on each cycle. For example, at time t0 a gate 75 is opened to transfer the sum at the output of adder 65 to a location 76 in register R-0 and at time t1 a gate 77 transfers the output of adder 65 to a location 78 in register R-0. The connections are shown in an ordered array in FIG. 7 and will be readily apparent.

FIG. 7 can be further understood from the following tables that show the contents of registers R-0 through R-3 for successive cycles defined by the clock signal on line 59. A dash in a table indicates that the data value is not significant.

TABLE 1

| Time | R-0 |
|---|---|
| 0 | 00+01, 02+02 —, — |
| 1 | 00+01, 02+03, 04+05, 06+07 |

| Time | R-1 |
|---|---|
| 0 | 00−01, 02−03 —, — |
| 1 | 00−01, 02−03, 04−05, 06−07 |

At this point in the operation, registers R-0 and R-1 are loaded and in the next two cycles registers R-2 and R-3 are similarly loaded.

TABLE 2

| Time | R-2 |
|---|---|

TABLE 2-continued

| | |
|---|---|
| 2 | 10+11, 12+13 —, — |
| 3 | 10+11, 12+13, 14+15, 16+17 |

| Time | R-3 |
|---|---|
| 2 | 10−11, 12−13, —, — |
| 3 | 10−11, 12−13, 14−15, 16−17 |

At times t2 and t3 when the load operation shifts to R-2 and R-3, registers R-0 and R-1 hold the first row of the second pass array and timing signals t2 and t3 are applied successively to the gates connecting these registers to the memory data in bus to transfer their contents to the memory. Similarly, at the next times t0 and t1 the contents of registers R-2 and R-3 are gated to the memory data in bus.

The Address Translator

The following table illustrates the structure of the address translator 61 and further illustrates the structure and the operation of the gating circuit of FIG. 7.

TABLE 3

| Time | Count | Fetch | Add/Sub | Reg. | Store |
|---|---|---|---|---|---|
| 0 | 0000 | 0000 | 00−01, 02−03 | (R-2) | (0111) |
| 1 | 0001 | 0001 | 04−05, 06−07 | (R-3) | (1111) |
| 2 | 0010 | 0010 | 10−11, 12−13 | R-0 | 0000 |
| 3 | 0011 | 0011 | 14−15, 16−17 | R-1 | 1000 |
| 0 | 0100 | 0100 | 20−21, 22−23 | R-2 | 0001 |
| 1 | 0101 | 0101 | 24−25, 26−27 | R-3 | 1001 |
| 2 | 0110 | 0110 | 30−31, 32−33 | R-0 | 0010 |
| 3 | 0111 | 0111 | 34−35, 36−37 | R-1 | 1010 |
| 0 | 1000 | 1000 | 40−41, 42−43 | R-2 | 0011 |
| 1 | 1001 | 1001 | 44−45, 46−47 | R-3 | 1011 |
| 2 | 1010 | 1010 | 50−51, 52−53 | R-0 | 0100 |
| 3 | 1011 | 1011 | 54−55, 56−57 | R-1 | 1100 |
| 0 | 1100 | 1100 | 60−61, 62−63 | R-2 | 0101 |
| 1 | 1101 | 1101 | 64−65, 66−67 | R-3 | 1101 |
| 2 | 1110 | 1110 | 70−71, 72−73 | R-0 | 0110 |
| 3 | 1111 | 1111 | 74−75, 76−77 | R-1 | 1110 |

The columns "Time" and "Count" show the contents of the counter 58 in the repeating sequence of times t0 through t3 that are defined by the lines in FIG. 7. Note that the two low order bits of the count define the time; higher order bits can similarly define longer operations such as counting groups of horizontal lines. The column "Fetch" is the low order four bits of address that is produced by address translator 61 at successive counts for a fetch operation in memory 16. (Higher ordered bits not shown locate the arrays within the store.) It can be seen that these address bits are the same as the counter contents, or more generally that they proceed sequentially through the array 50. The column "Add/Sub" shows the octal addresses of the two pairs of data units that are fetched from the memory and applied to the adders and subtractors at the time given in the same row. It can be seen that the first four entries in this column are the same as the representative entries shown above the adders and subtractors in FIG. 7. The column "Reg." identifies one of the four registers R-0 through R-3 in FIG. 7 that is transferred into storage at the time given in the same row and the column "Store" is the address in storage where the register contents are stored.

Registers R-0 through R-3 represent part of a data pipe line that is filled at the beginning of an operation to process a sequence of television frames (i.e., many G or X matrices) and the parenthesis for the Reg. and Store columns in the first two rows of the table signify that the gates at the outputs of the registers are inhibited for these cycles but that these cycles are subsequently used to load registers R-2 and R-3 into storage locations 0111 and 1111.

Second Pass Operation

The components of the system have been described so far in relation to a first pass through the arithmetic unit in which the storage entries represented by FIG. 2 are operated on to produce the array of FIG. 3. There are six passes through the arithmetic unit for each X matrix on line 11 or G matrix on line 37. Passes two and three are represented by FIGS. 4 and 5 and the completion of the third pass represents premultiplication of the X or G matrix by the Hadamard matrix. Passes 4, 5, and 6 represent post multiplication by the Hadamard matrix and this operation is also shown by FIGS. 2 through 5. All of the passes are identical, as can now be explained.

FIG. 4 shows the results of the second pass through the arithmetic unit in which the contents of the memory as represented by FIG. 3 are applied to the arithmetic unit and the sums and differences are stored in the memory according to the address sequence of Table 3 and as is represented by FIG. 4.

It can be seen readily that the fetch operation for the second pass is identical to the fetch operation for the first pass. Thus the first row in the table shows fetching the first half row having the sums 00+01, 02+03, 04+05, and 06+07. In the same operation that was described for the first pass, the arithmetic unit produces the sums (00+01)+(02+03) and (04+05)+(06+07). In FIG. 4 these sums are written 00-03 and 04-07 and the legend + + + + along rows 0 and 1 signifies that all the terms in the row are sums. Similarly, row four has the same terms with the legend + − + − signifying that the first term has beed added, the second subtracted, the third added, and the fourth substracted. The third pass will be understood from FIG. 5 and the explanation of the preceding passes. Passes 4, 5, and 6 perform a second multiplication by a Hadamard matrix and can be understood from this description of the first multiplication.

The Output Buffer 41

Each matrix has information from eight horizontal lines of the television picture but only for the corresponding width along the lines, and a number of individual matrices are processed to form the full information for eight horizontal lines and this information is loaded into an output buffer. For example there may be sixty-four matrices across the picture. When all sixty-four matrices for eight horizontal lines have been processed and loaded into the buffer 41, the information is unloaded from the buffer and transmitted to the television set, beginning with the uppermost row of the leftmost matrix. In the following description, the matrices will be identified as 1 through 64. Notice that the matrices are loaded into the output buffer in the order 1 through 64 but that the buffer is unloaded in the order of successive rows of the entire group of the matrices. The matrices thus provide 512 picture points along each of the eight horizontal lines. Accordingly, It is convenient to visualize the output buffer as having storage locations numbered 0 through 4095 that are arranged in 512 columns and 8 rows as is represented by the following table of decimal addresses.

TABLE 4

| BUFER ADDRESSING | | | |
|---|---|---|---|
| 0 | 1 | 2 | 511 |
| 512 | 513 | 514 | 1023 |
| 1024 | 1025 | 1026 | 1535 |
| 1536 | | | |
| . | | | |
| 3584 | | | 4095 |

The elements of the X matrix in the output buffer are each represented by eight bits, and in the peceding tables each entry represents an eight-bit storage unit or byte for the luminance value of the picture at the corresponding point in a group of eight rows. In the following description, the data is handled in storage words of eight bytes that correspond to a row of a matrix. Memories of this word size are commonly available, or multiple memories of smaller word size can be used as is conventional.

According to one feature of this invention, the output buffer is loaded in the same sequence that it is unloaded and so that a single output buffer can be used in contrast to the conventional use of two buffers that are alternately loaded and unloaded. There are a memory store and a memory fetch (two memory cycles) on each processor output cycle and the store may occur at the location of the immediately preceding fetch or a few locations behind as will be apparent. The addressing sequence is provided by an address translator like the address translator of FIG. 1 except that it has enough entries to operate in a cycle that loads and unloads the buffer three times and then repeats the same addressing sequence. The addressing sequence can be understood most readily from the following tables that show the addressing on successive load cycles.

TABLE 5

| | First Load Cycle | | | |
|---|---|---|---|---|
| Row | M-1 | M-2 | M-3 | M-64 |
| 0 | 0–7 | 8–15 | 16–23 | 504–511 |
| 1 | 512–519 | 520–527 | | |
| 2 | 1024–1031 | | | |
| . | | | | |
| 7 | 3584–3591 | | | 4088–4095 |

In Table 5 each column identifies one of the sixty-four matrices of the buffer and each row represents a row of the matrices. The entries in the table are the addresses of the storage locations in the buffer where each row of each matrix is stored. For example, row 1 of matrix 2 is stored in the eight byte locations 520–527 of the array. It can be seen that in the first load cycle each matrix is stored in its eight by eight form as though the matrices were simply placed side by side in sequential order. Notice that although Table 5 is an address table and not a storage array representation, the starting addresses for the rows have the same sequence as the storage address array of Table 4. Thus the first load cycle produces a direct map of the way in which the information is presented on the television screen. Consequently, the unload operation proceeds across rows of the physical storage array of Table 4 and also across the rows of Table 5. For example, in an unload operation, row 0 of matrix 1 is first fetched from byte locations 0–7, then row 0 of matrix 2 is fetched from byte locations 8–15, and so on.

The format of Table 5 is preserved in the following tables which show the distribution of addresses for each row of each matrix on subsequent memory cycles. Thus, the sequences of addresses that is presented to buffer 41 can read across the rows of Tables 5–8.

TABLE 6

| | Second Load Cycle | | | |
|---|---|---|---|---|
| Row | M-1 | M-2 | M-3 | M-64 |
| 0 | 0–7 | 64–71 | 128–135 | 4032–4039 |
| 1 | 8–15 | 72–79 | | |
| 2 | 16–23 | | | |
| . | | | | |
| 7 | 56–63 | 120–127 | | 4088–4095 |

In Table 6, it can be seen that the rows of matrix 1 (reading down the column) follow sequentially across the first row of the store, the rows of matrix 2 and matrix 3 also follow so that matrices 1 through 8 are stored on the first row. That is, as the first row of the buffer of Table 5 is unloaded to form the first of a set of eight horizontal television lines, the output of the arithmetic unit is loaded sequentially along this buffer row in the sequence matrix 1, row 0, matrix 1, row 1...matrix 2, row 0, etc. The sixty-four bytes of matrix 1 take the first sixty-four byte locations of storage which have addresses 0 through 63. The other rows of the buffer are loaded in sequence and matrix 64 occupies the last 64 storage locations of row 7.

For the operation of unloading the buffer at this cycle, row 0 of matrix 1 is first unloaded from storage locations 0–7, row 0 of matrix 2 is next unloaded from storage locations 64–71, and so on, as can be seen by reading across the rows of the table.

TABLE 7

| | Third Load Cycle | | | | |
|---|---|---|---|---|---|
| Row | M-1 | M-2 | M-8 | M-9 | M-64 |
| 0 | 0–7 | 512–519 | 3584–3591 | 8–15 | 56–63 |
| 1 | 64–71 | 576–583 | 3648–3655 | 72–79 | 120–127 |
| 2 | 128–135 | 640–647 | 3712–3719 | 136–143 | 184–191 |
| . | | | | | |
| 7 | 448–455 | 960–967 | 4032–4039 | 456–463 | 4088–4095 |

The storage sequence for loading the first matrix is 0–7, 64–71, etc., as is shown in the columns of the table. This load operation proceeds in the sequence in which the buffer is unloaded, as has already been explained. Thus, from Tables 6 and 7 it can be seen that Table 7 is formed by filling the columns of Table 7 from the rows of Table 6. Thus for the Fourth Load Cycle it will be apparent that the cycle continues by repeating the storage assignment of Table 6.

From the description of preferred embodiments of the invention, those skilled in the art will recognize a variety of implementations within the scope of the claims.

Having thus described our invention, what we claim as new, and desire to secure by Letters Patent is:

1. In a video player or recorder apparatus, a processor for a Hadamard transform of picture information, comprising,
a data store having data accessible in a memory word comprising a predetermined number of data units,
an arithmetic unit comprising a plurality of adders and a like plurality of subtractors each having two inputs for receiving a data unit of a predetermined number of bits, timing means defining cycles of the data store and the arithmetic unit, means for initially loading an array of the data store in a predetermined order with a matrix to be processed, addressing means including means for fetching a memory word on each cycle and first gating means for supplying each data unit of a fetched memory word to a predetermined input of one adder and one subtractor, a plurality of registers each holding the number of data units in a memory word, and second gating means for transferring the output of each adder and each subtractor to a predetermined data unit position of said registers in a repeating pattern of a plurality of cycles, and third gating means and store operation means in said addressing means for loading a register into a predetermined data store word location on each cycle in an identical addressing pattern for the fetch and store operations during each of a plurality of passes of arrays of the data store through the arithmetic unit.

2. The processor of claim 1 comprising a data store having a memory word size of four data units, two adders and two subtractors and four registers and second gating means connecting each adder and each subtractor to one data unit position in each register in a pattern that repeats over four cycles, and third register means connecting said registers to said data store for loading one of said registers into said data store on each cycle.

3. In a video player for a video disk, apparatus for processing eight by eight matrices of picture information read from the disk, comprising, an arithmetic unit comprising two adders and two subtractors each having two inputs for receiving a data unit having a predetermined number of bits, a data store holding at least two arrays of matrices read from the disk, timing means defining cycles of the store and the arithmetic unit, means for initially loading an array of the store in a predetermined order with a matrix read from the disk, addressing means including means for fetching a memory word of four data units on each cycle and gating means for supplying each data unit of a fetched memory word to a predetermined input of one adder and one subtractor according to a fast Hadamard transform, four registers each holding four data units and gating means for transferring the output of each adder and each subtractor to a predetermined data unit position of each of said four registers in a repeating pattern over four cycles, and register gating means and further addressing means for loading a register into a predetermined word location of the data store on each cycle in an identical addressing pattern for fetch and store operations on each of six passes of arrays of the data store through the arithmetic unit.

4. The video player of claim 3 including, an output buffer for holding multi-bit data units produced by the processing apparatus representing eight lines of video to be displayed, addressing means for unloading data units from the output buffer in the order to present a television display and for loading the buffer for a next group of eight lines in the sequence in which the buffer is unloaded in a buffer addressing cycle that repeats after a plurality of said groups of eight horizontal lines.

5. The video player of claim 4 wherein said addressing means includes means for loading the buffer with the sequence of data units to be unloaded in the numerical sequence of addressing the buffer for one group of eight horizontal lines in each repeating buffer addressing cycle.

* * * * *